US008024771B2

(12) United States Patent
Malkin et al.

(10) Patent No.: US 8,024,771 B2
(45) Date of Patent: Sep. 20, 2011

(54) POLICY-BASED METHOD FOR CONFIGURING AN ACCESS CONTROL SERVICE

(75) Inventors: Peter Kenneth Malkin, Ardsley, NY (US); Alan Michael Webb, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 11/857,952

(22) Filed: Sep. 19, 2007

(65) Prior Publication Data

US 2009/0077086 A1   Mar. 19, 2009

(51) Int. Cl.
G06F 17/00 (2006.01)
G06F 7/04 (2006.01)
H04L 29/06 (2006.01)

(52) U.S. Cl. ............ 726/1; 726/2; 726/3; 726/4; 726/6; 726/14; 726/16; 726/17; 726/21; 726/30; 713/165; 713/167

(58) Field of Classification Search ................ 726/1, 16, 726/21; 713/167
See application file for complete search history.

(56) References Cited

U.S. PATENT DOCUMENTS

| 5,263,157 | A * | 11/1993 | Janis ................................. 1/1 |
| 5,765,153 | A * | 6/1998 | Benantar et al. ................. 1/1 |
| 6,158,007 | A * | 12/2000 | Moreh et al. ................... 726/1 |
| 6,292,904 | B1 * | 9/2001 | Broomhall et al. .............. 714/1 |
| 6,745,245 | B1 * | 6/2004 | Carpenter ...................... 709/229 |
| 7,178,164 | B1 * | 2/2007 | Bonnes ............................. 726/2 |
| 2003/0177390 | A1 * | 9/2003 | Radhakrishnan ............. 713/201 |
| 2005/0021980 | A1 * | 1/2005 | Kanai ............................. 713/182 |
| 2006/0294297 | A1 * | 12/2006 | Gupta ............................. 711/108 |
| 2007/0002862 | A1 * | 1/2007 | Kanekar et al. ................ 370/392 |
| 2007/0150441 | A1 * | 6/2007 | Morris ............................. 707/3 |
| 2007/0157287 | A1 * | 7/2007 | Lim ................................. 726/1 |
| 2007/0157288 | A1 * | 7/2007 | Lim ................................. 726/1 |
| 2007/0169168 | A1 * | 7/2007 | Lim ................................. 726/1 |
| 2008/0060051 | A1 * | 3/2008 | Lim ................................. 726/1 |
| 2008/0184336 | A1 * | 7/2008 | Sarukkai et al. ................ 726/1 |
| 2009/0083831 | A1 * | 3/2009 | Kanai ............................. 726/1 |
| 2010/0023582 | A1 * | 1/2010 | Pedersen et al. .............. 709/203 |

OTHER PUBLICATIONS

Casassa-Mont et al, Mar. 16, 2006, A Systemic Approach to Privacy Enforcement and Policy Compliance, HP Laboratories Bristol.*
Anne Anderson, 2005, A Comparison of Two Privacy Policy Languages EPAL and XACML, Sun Microsystems Laboratories, pp. 1-35.*

* cited by examiner

*Primary Examiner* — Edan Orgad
*Assistant Examiner* — Jenise E Jackson
(74) *Attorney, Agent, or Firm* — Michael J. Buchenhorner; Derek S. Jennings (57) ABSTRACT

A system and method for processing a request by a first control service using a first control specification language, and a second control service using a second control specification language includes steps of: receiving the request from a requestor; providing the request to the first and second control services; receiving a decision on the request from each of the first and second control services; and comparing the decisions. The first control specification language is an access control policy.

35 Claims, 7 Drawing Sheets

| Policy Term | System ID |
|---|---|
| ... | ... |
| <term> | <object ID> |
| ... | ... |
| ... | ... |

POLICY-BASED METHOD FOR CONFIGURING AN ACCESS CONTROL SERVICE

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

Not Applicable.

FIELD OF THE INVENTION

The invention disclosed broadly relates to the field of data security and more particularly relates to the field of access control lists.

BACKGROUND OF THE INVENTION

Securing an organization's data is vital. In fact, it is quite possibly an information technology administrator's most important undertaking. Many tools have emerged to make this monumental task easier and less time-consuming. Access Control Lists (ACL) are widely used to control access to files. An ACL is basically an ordered list of rules governing data access. Configuring an access control system such as IBM's® RACF® to comply with a set of policies is an arduous task.

The standard procedure is for one or more security managers to be given a set of access control policies. These are often specified in natural language. The security manager must then use these policies to configure their organization's access control engine(s). This usually involves attempting to ensure that every relevant access request is covered by the configuration. This cumbersome task produces an access control configuration that is extremely large and complex. However, only a small percentage of access requests covered by this unwieldy configuration are ever actually received, which means that the large size and complexity of the ACL system's configuration is unnecessary.

It is also difficult, or, sometimes, impossible to determine the high level policy rules upon which a given ACL system's configuration was based. The configuration only deals with system objects, like files or applications. There are systems, like Consul, which take a given system's ACL decision logs and then provide high level translations. The drawback is that this only allows users to see the rules which were followed (based on logged access requests); it does not allow one to specify the high level rules themselves.

There is a need for an ACL system that overcomes the above-stated shortcomings of the known art.

SUMMARY OF THE INVENTION

Briefly, according to an embodiment of the invention a method for processing a request by a first control service using a first control specification language, and a second control service using a second control specification language includes steps or acts of: receiving the request from a requestor; providing the request to the first and second control services; receiving a decision on the request from each of the first and second control services; and comparing the decisions. The first control specification language is an access control policy.

The method can be advantageously used as part of a system for obtaining services for process an access request by a first control service using a first control specification language, and a second control service using a second control specification language.

The method can be implemented as part of a computer program product embodied on a computer readable medium such as a CD-ROM. The method can also be implemented as machine executable instructions executed by a programmable information processing system or as hard coded logic in a specialized computing apparatus such as an application-specific integrated circuit (ASIC).

A system configured for carrying out the method steps would include: data storage configured for storing the first and second control specification languages (access control policies); a database configured for creating, deleting, and modifying persistent data; memory comprising logic; and a processor operatively connected to said memory.

BRIEF DESCRIPTION OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method for configuring an access control list (ACL) service so that its decisions comply with a given policy, this policy is written in a structured language, including, but not limited to, that provided by the OASIS XACML standard. This method enables one to specify ACL rules in a high level language and then see how an existing ACL system's responses compare (i.e., to see if the responses conform to the policy rules). Additionally, the method configures an existing ACL system so that its decisions match those of a system whose decisions are based on known, high-level policies. The configuration of the system, unlike known methods of configuring an ACL system, can be performed quickly, using a configuration targeted at only relevant requests. Additional advantages of the invention include the ability to configure a non-production instance of a control service. A non-production instance is one that is off-line or inaccessible to other services. Those skilled in the art will realize it is advantageous to institute configuration changes to non-production services and by doing so avoid downtime or reliability issues to production services. Once changes to non-production services have been verified or completed they can be transferred (i.e.: swapped) to a production service, thereby making the changes 'live' and subject to real-world conditions. Production services will reflect the balance of the changes desired and will be available to the entire site or target community in the manner desired.

The method provides advantages including: 1) obtaining a service configuration that complies with a given high-level policy; 2) obtaining a highly simplified service configuration, including only specifications for system requests that are likely to be received (for example, those requests that have actually been received in the past); and 3) associating configurations with policies such that a given configuration can be quickly deployed when needed. The method can be applied as a wrapper to a currently-running ACL system.

Figure 1:
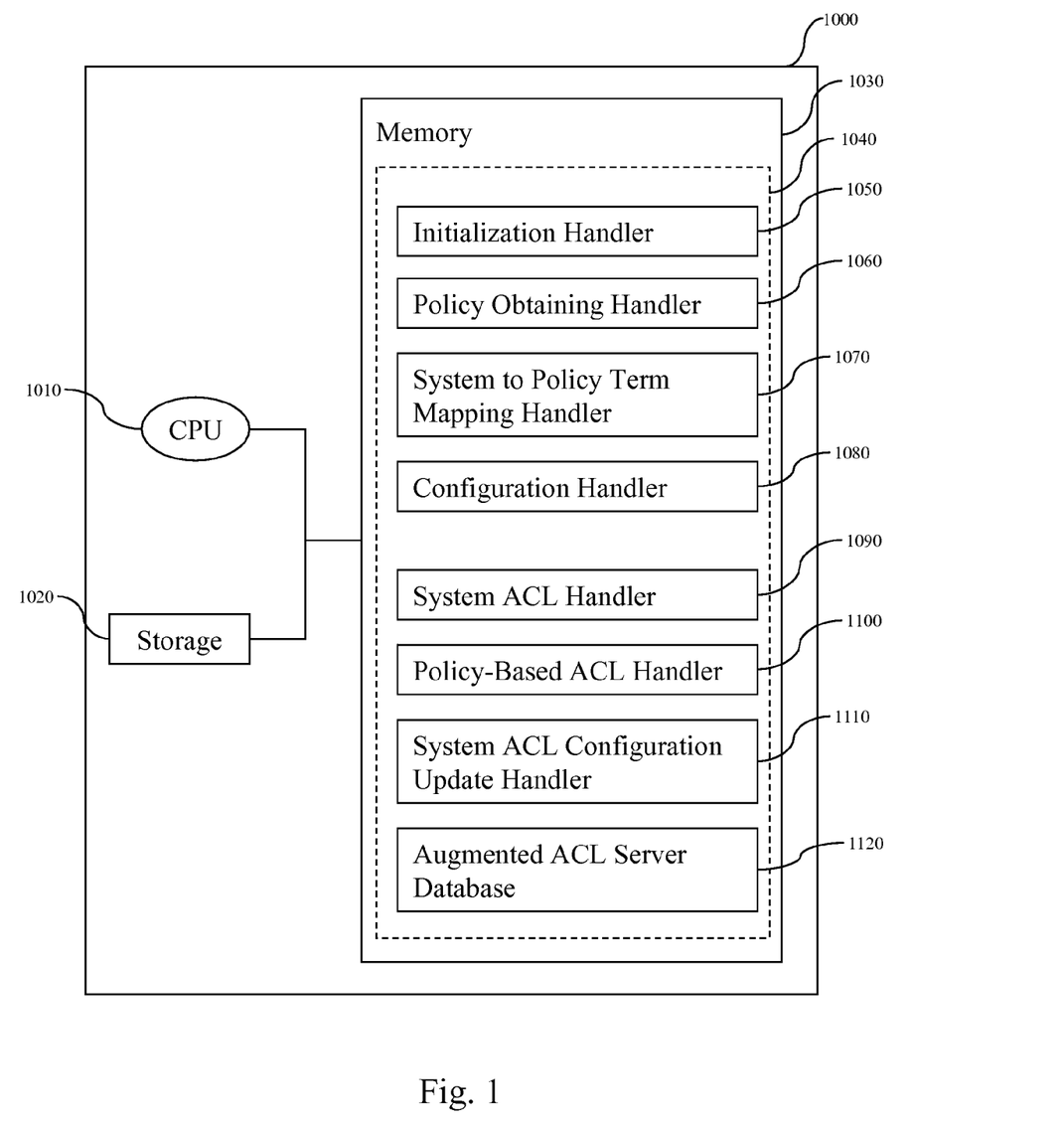
FIG. 1 is a simplified block diagram of an augment ACL server configured to operate according to an embodiment of the present invention.

Referring now in specific detail to the drawings, and particularly FIG. 1, there is illustrated a simplified block diagram of a preferred embodiment showing an Augmented Access Control (ACL) Server 1000 according to the current invention. This server includes both a System ACL Handler 1090 and a Policy-Based ACL Handler 1100. We refer to the System ACL as the currently-running ACL. It should be noted that we limit our examples to access control systems for clarity only; the method as described herein can be advantageously used on other types of systems.

The description will show (1) how the decisions of the two access control Handlers 1090 and 1100 can be compared for any given request, and (2) how the System ACL Handler 1090 can be configured so that its decisions match those of the Policy-Based ACL Handler 1100.

FIG. 1 shows a component block diagram of the Augmented ACL Server 1000 configured to operate according to an embodiment of the invention. This Server 1000 may encompass any computing node that is able to load and execute programmatic code, including, but not limited to: products sold by IBM such as ThinkPad® or PowerPC®, running the operating system and server application suite sold by Microsoft, e.g., Windows® XP, or a Linux operating system. The Server 1000 may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory 1030 that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 1030 represents either a random-access memory or mass storage. It can be volatile or non-volatile. The memory 1030 may be partitioned or otherwise mapped to reflect the boundaries of the various memory subcomponents.

System logic 1040 is preferably embodied as computer executable code that is loaded from a remote source (e.g., from a network file system), local permanent optical (CD-ROM), magnetic storage (such as disk), or storage 1020 into memory 1030 for execution by the CPU 1010. As will be discussed in greater detail below, the memory 1030 preferably includes computer readable instructions, data structures, program modules and/or application interfaces forming the following components:

Initialization Handler 1050 for initializing the Augmented ACL Server 1000.

Policy Obtaining Handler 1060 for receiving the new policy as input and performing initial processing on the policy.

System-to-Policy Term Mapping Handler 1070 for mapping the policy terms to the system IDs in a one-to-one correspondence and generating a table with the mappings.

Configuration Handler 1080 for configuration the access control systems.

System ACL Handler 1090 for handling all invocations to the System ACL system.

Policy-Based ACL Handler 1100 for handling all invocations to the Policy-Based ACL system.

System ACL Configuration Update Handler 1110 for processing configuration updates.

Augmented ACL Server Database 1120 for storing the mappings.

The Augmented ACL Server Database 1120 in one embodiment provides for creation, deletion and modification of persistent data, and is used by the Handlers 1050-1110 of the Augmented ACL Server 1000. An example of a product providing such a function includes the IBM DB/2 database system. In one embodiment of the current invention, all of the access-permitting rules used by the System ACL Handler 1090 are stored in the Augmented ACL Server Database 1120. One with regular skill in the art will appreciate that the current invention also covers cases where the System ACL Handler 1090 stores its rules elsewhere, modifications being made through update calls to the System ACL Handler 1090, rather than through data manipulation calls to the Database 1120.

Figure 2:
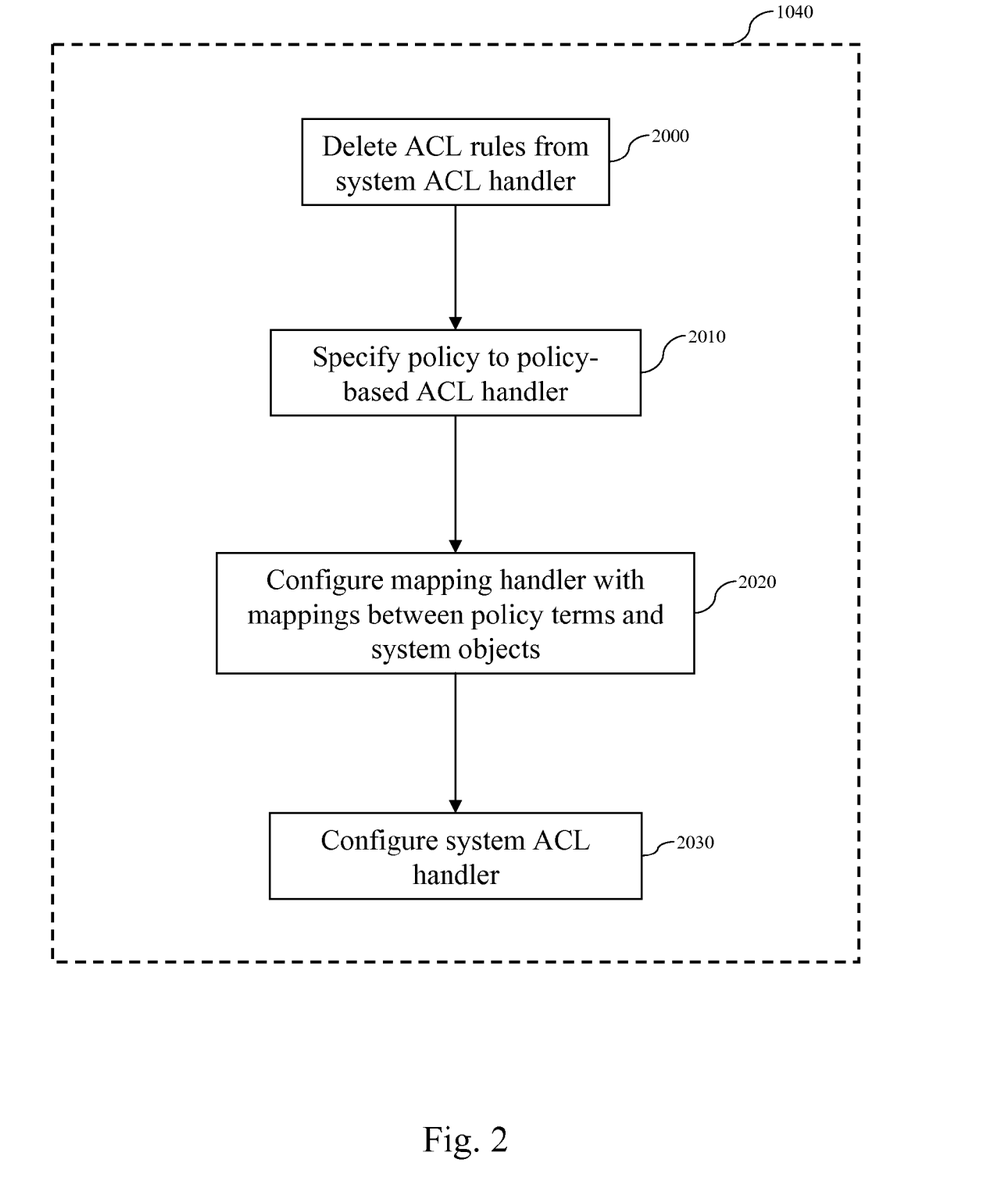
FIG. 2 is a high-level flow chart illustrating the flow control for the augmented ACL server, according to an embodiment of the present invention.

FIG. 2 is a flow diagram illustrating the control flow of the Augmented ACL Server's Logic 1040 in one embodiment of the present disclosure. At step 2000, the Initialization Handler 1050 is invoked to delete all access-permitting specifications from the System ACL Handler 1090. In one embodiment of the current invention, this involves deleting access-permitting specifications from the Augmented ACL Server Database 1110. This means that until the configuration is modified, the System ACL Handler 1090 will return an answer of "Deny" to any and all requests posed to it. This is one way of starting with a clean configuration.

Next, in step 2010, a policy is supplied to the Policy-Based ACL Handler 1100 via an invocation of the Policy Obtaining Handler 1060, described in detail with reference to FIG. 3. In step 2020, the System to Policy Term Mapping Handler 1070 is invoked to provide a translation between the system objects specified in system access requests and the terms specified in the given policy that pertain to the system objects. A detailed description of this mapping procedure is given with reference to FIGS. 4 and 5.

Next, in step 2030, the Configuration Handler 1080 configures the System ACL Handler 1090 according to the new policy. This process is described in detail with reference to FIG. 6.

Figure 3:
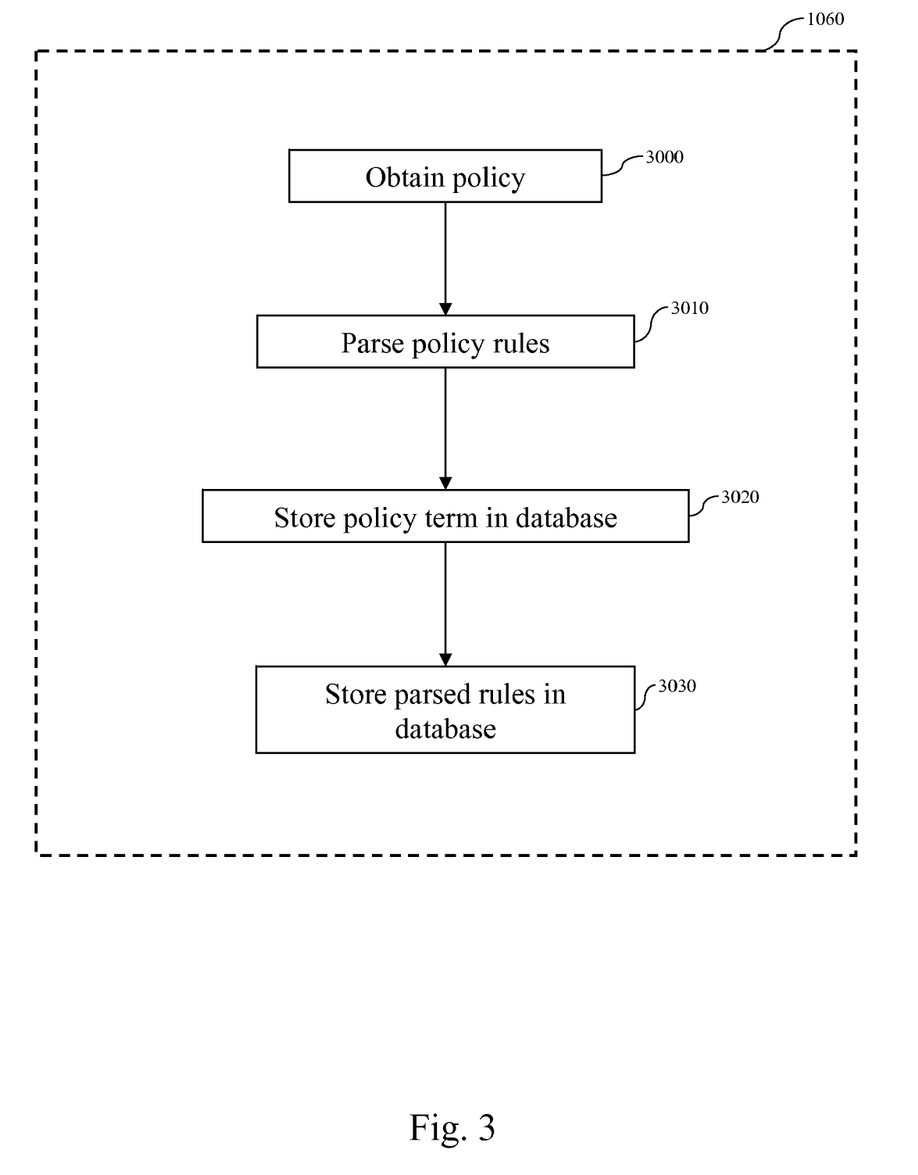
FIG. 3 is a low-level flow chart of the flow control for the Policy Obtaining Handler according to an embodiment of the present invention.

FIG. 3 is a flow diagram illustrating the control flow of the Policy Obtaining Handler 1060 in one embodiment of the present disclosure. This Handler 1060 is responsible for determining the terms and structured version of the given policy, and then storing this information in the Augmented ACL Server Database 1120. In one embodiment of the current invention, a policy is composed of zero or more rules, with each rule being of the form:

policy-rule(<policy-subject>,<policy-action>,<policy-resource>)

Where:
<policy-subject> identifies a category of user or group of users;
<policy-action> identifies a type of access (e.g., read or write); and
<policy-resource> identifies a category of resource.

At step 3000, the Handler 1060 obtains (e.g., is passed) a policy containing zero or more rules. In one embodiment of the current invention this policy is a security policy encoded using the OASIS XACML standard. This and other policy embodiments specify a default "Deny" policy, meaning that a given request is denied unless there is one or more policy rules that allow it.

In step 3010, the Handler 1060 identifies and retrieves all of the unique terms in the given policy, these terms being of type subject role, action or resource. Examples of subject roles include "doctor" and "manager." Examples of actions include "review" and "update," and examples of resources include "home address" and "medical test result." Once retrieved, the Handler 1120 stores all of these categorized terms in the Augmented ACL Server Database 1120 in step 3020.

In one embodiment of the current invention each type of term is stored in a table associated with that type of term, e.g., subject-terms, action-terms, and resource-terms respectively. Finally, in step 3030, the Handler 1060 stores each of the policy rules in the Augmented ACL Database 1120. In one embodiment of the current invention the Handler 1060 stores each rule in a rule table, this table having columns for each type of term.

Figure 5:
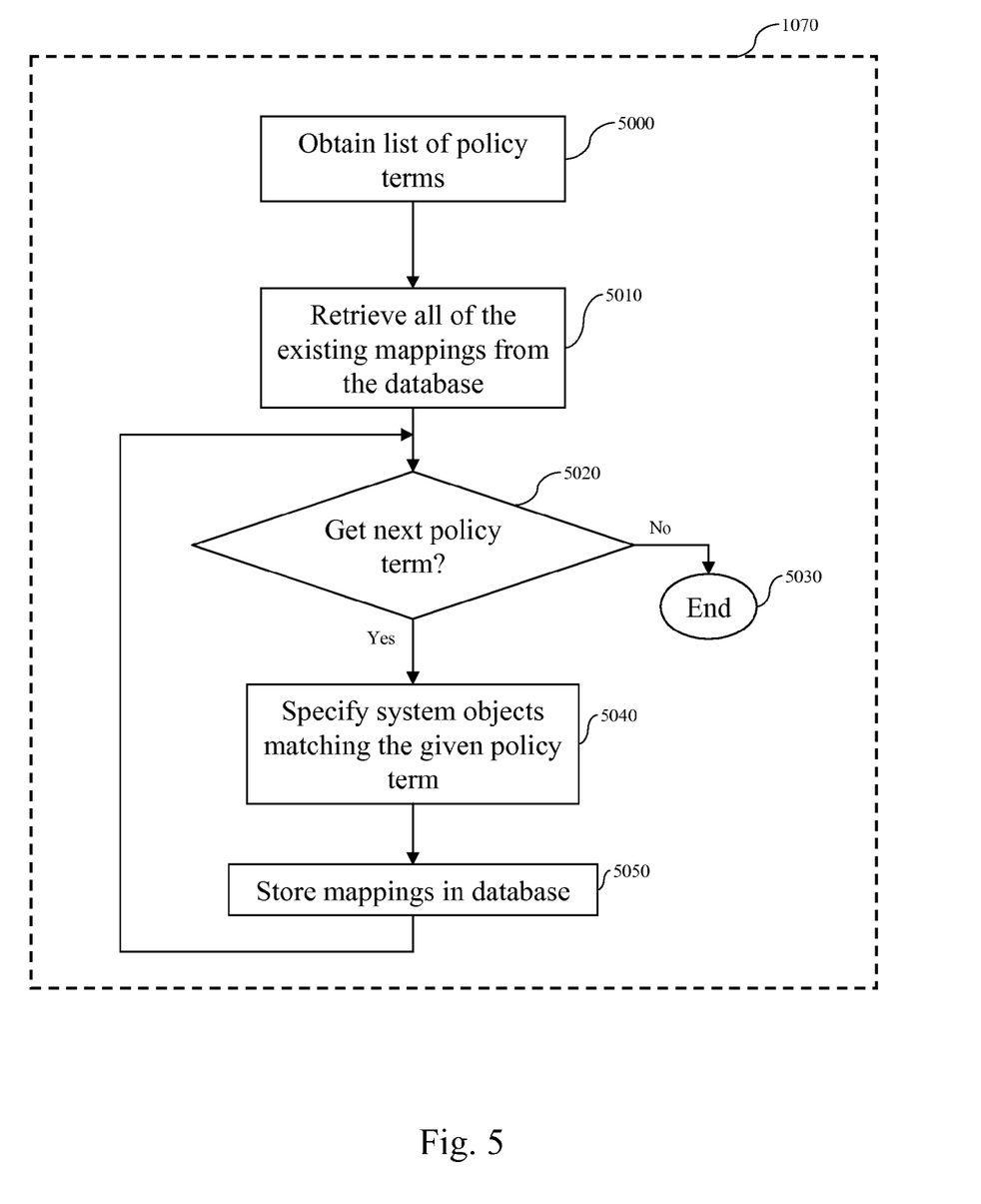
FIG. 5 is a low-level flow chart of flow control for the System to Policy Term Mapping Handler, according to an embodiment of the present invention.

FIG. 5 is a flow diagram illustrating the control flow of the System to Policy Term Mapping Handler 1070 in one embodiment of the present disclosure. This Handler 1070 is responsible for providing a mapping between system objects, i.e., those objects specified in access requests posed to the Augmented ACL Server 1000, and the terms specified in the policies. Note that in one embodiment of the current invention, requests to the Augmented ACL Server 1000 are of the form:

system-request(<system-subject>,<system-action>,<system-resource>)

Where:
<system-subject> identifies a particular system user or group of users;
<system-action> identifies a type of system resource access (e.g., read or write); and
<system-resource> identifies a particular system resource (e.g., a file, c:/home/bar.txt) or group of resources (e.g., any file in a particular subdirectory, c:/home/*).

Figure 4:
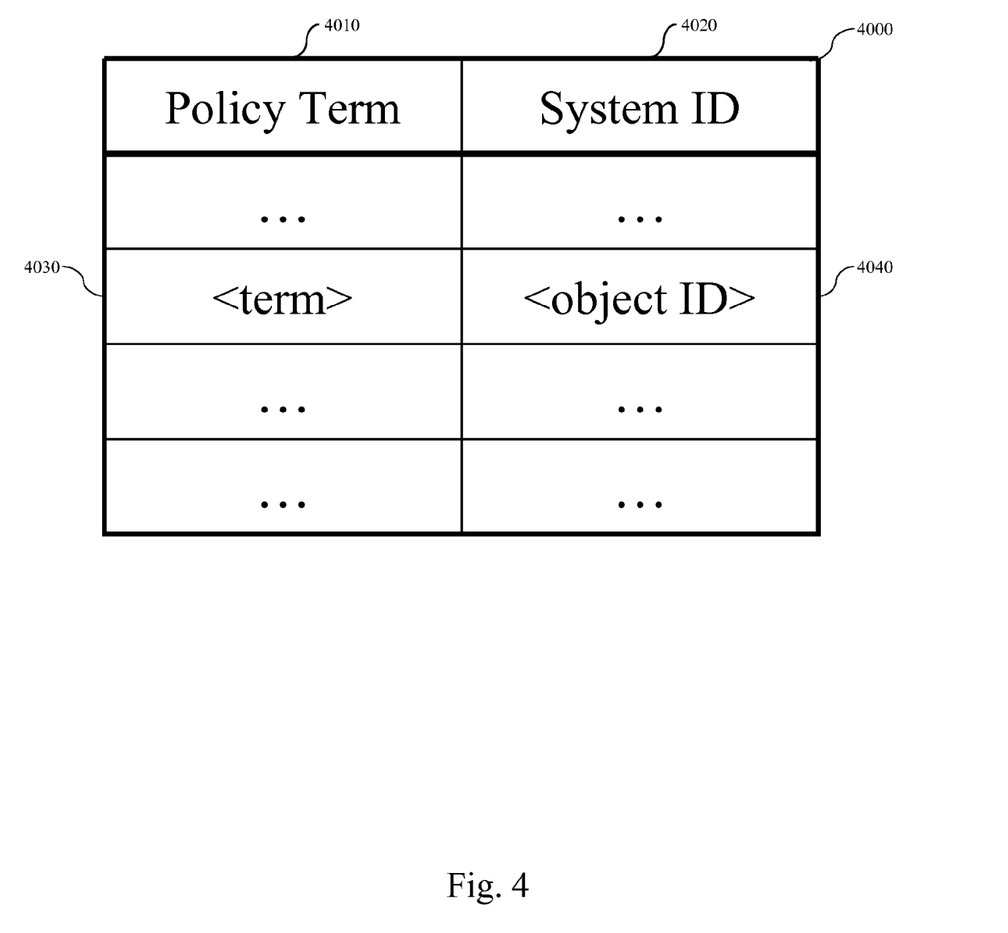
FIG. 4 shows a table layout overview of the system object to policy term mappings tables, according to an embodiment of the present invention.

In one embodiment of the present disclosure, the System to Policy Term Mapping Handler 1070 provides a mapping between the systems and policy terms by creating and filling three tables: subject-mappings, action-mappings, and resource-mappings, each of these tables providing the mappings for the subject, action and resource terms respectively. As depicted in FIG. 4, each of these tables 4000 contains two columns, one for the given type's policy terms 4010 and one for the identifier of an associated system object 4020. Each row of each table 4000 contains the particular mappings. For example, a row of the subject-mappings table might have the policy term subject term "manager" 4030 associated with the system group "Level-10" 4040; the action-mappings table might have the policy action term "review" 4030 associated with the system action id "read" 4040; and the resource-mappings table might have the policy resource term "home address" 4030 associated with the system resource ID "employee.data.personal.address."

In step 5000 of FIG. 5, the System to Policy Term Mapping Handler 1070 retrieves all of the policy terms from subject-terms, action-terms and resource-terms tables from the Augmented ACL Server Database 1120. In step 5010, the Handler 1070 retrieves all of the existing mappings from the Augmented ACL Server Database 1120, (i.e., subject-mappings, action-mappings and resource-mappings).

In step 5020, the Handler 1070 attempts to take the next unprocessed term from the list of terms retrieved in step 5000, checking whether there are any such terms left. If not, then in step 5030, the Handler 1070 terminates, returning control to its invoker. If there is such a term, then, in step 5040, the user is able to specify which additional system objects are associated with the given term, beyond those already specified in the mapping tables retrieved in step 5010. Each new association is stored in the Augmented ACL Server Database 1120 in step 5040. Following this, control continues at step 5010.

Figure 6:
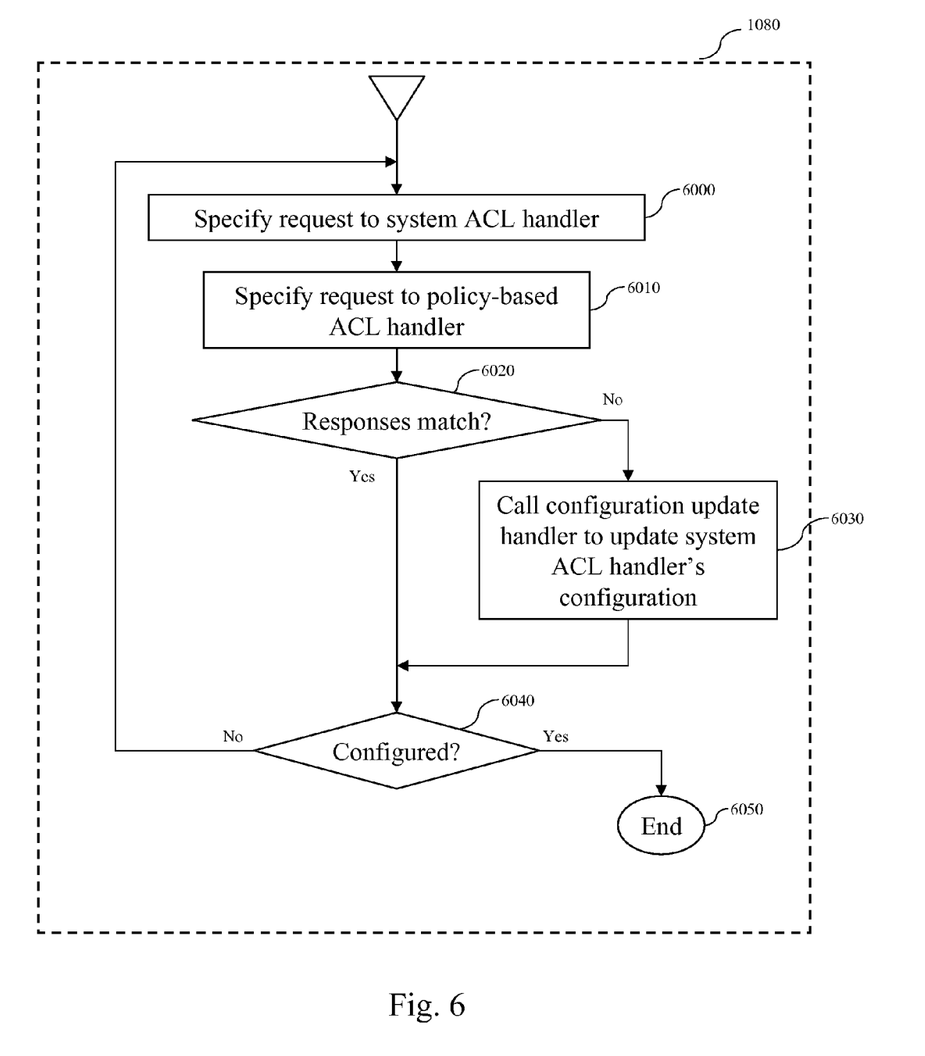
FIG. 6 is a low-level flow chart of the processing performed by the Configuration Handler 1080, according to an embodiment of the present invention.

FIG. 6 is a flow diagram illustrating the control flow of the Configuration Handler 1080 in one embodiment of the present disclosure. This Handler 1080 is responsible for configuring the System ACL Handler 1090. In step 6000, the Handler 1080 specifies a request to the System ACL Handler 1090, and then, in step 6010, specifies the same request to the Policy-Based ACL Handler 1100, comparing the responses from the two Handlers 1090 and 1100 in step 6020.

If the responses match, then the Handler 1080 determines whether the configuration of the System ACL Handler 1090 is complete. In one embodiment of the current invention, this check is made by determining whether enough requests have been compared, the basis for this determination including, but not limited to, the total number of requests reaching a particular value (e.g., one million requests), and time period from which the requests are drawn is lone enough (e.g., requests for an entire year were compared). One with regular skill in the art will appreciate that the requests could be those specified to an existing running system, or retrieved from the Augmented ACL Server Database 1120 if such request had been stored previously. One with regular skill in the art will also appreciate that the request could be generated by a program. In one embodiment of the current invention this program could generate each request by randomly selecting an existing user ID, access and resource, and then combining them into a request.

If step 6020 finds that the responses to the given request from the System ACL Handler 1090 and the Policy-Based ACL Handler 1100 do not match, then in step 6030 the System ACL Configuration Update Handler 1110 is invoked, in order to modify the System ACL Handler's 1090 configuration so that in the future its response to the given request matches that of the Policy-Based ACL Handler 1100. In the case of IBM's® RACF®, this would involve creating a resource profile whose user ID, action and resource ID matched those of the request, and whose result matched that of the Policy-Based ACL Handler 1100. Following this, control continues at step 6040 where the Handler 1080 determines if the configuration process is complete.

Figure 7:
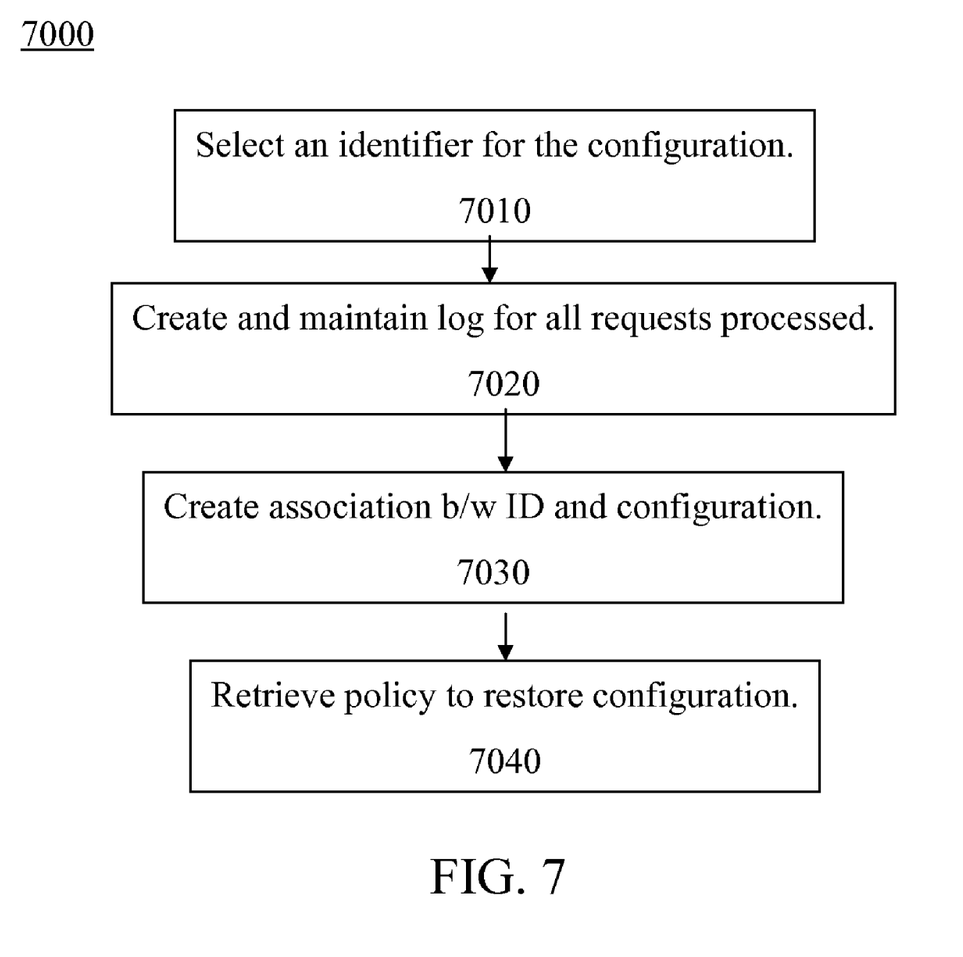
FIG. 7 is a flow chart of the processing for restoring a previous configuration, according to an embodiment of the present invention.

Another advantage of this method is that it provides the ability to not only easily set up a given configuration, but to also retrieve and restore a previous configuration. The process flow 7000 for this is shown in FIG. 7. First, in step 7010 the Configuration Handler 1080 selects an identifier to uniquely identify the configuration. Then in step 7020 the Database 1120 creates and maintains a log for all processed requests. This log will include the decisions made on the requests as well as the requests submitted. Next, in step 7030 the Mapping Handler 1070 creates an association between the unique identifier, the given policy and the log of requests. This association can be maintained in a table stored in the Database 1120. A previous control configuration can be restored by invoking the Policy Obtaining Handler 1060 to retrieve the policy in step 7040. The identifier would be used as input in order to identify the policy. Once the policy is retrieved, processing proceeds as before.

The method as described can further be advantageously used a service provided by a first user to a second user. The second user can pay for the service on a per-transaction basis, or as a subscriptions service. The second user's identification may be used as part of the identifier associated with the control system in order to facilitate monitoring of the service. The log of processed requests as mentioned previously can be used in order to allocate costs to the services provided.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A method for processing an access control list configuration request by a first control service using a first control specification language, and a second control service using a second control specification language, the method comprising steps of:
    receiving the access control list configuration request from a configuration request handler;
    providing the request to a first stand-alone control service using a high level programming language;
    providing the request to a second stand-alone control service using a low level programming language;
    receiving a decision on the request from each of the first and second control services; and
    comparing the decisions to determine if they differ, wherein differing decisions indicate a need to modify the configuration of said access control list using said first control service.

2. The method of claim 1, further comprising providing a notification to the requester if the two decisions differ.

3. The method of claim 1, further comprising returning a response to the requester based on a comparison of the decisions of the two control services.

4. The method of claim 1 wherein the first control specification language is an attribute-based access control policy.

5. The method of claim 4 further comprising:
    if the two decisions differ, modifying a control specification configuration of the second control service so that its decision agrees with the decision of the first control service.

6. The method of claim 5 wherein modifying the control specification configuration of the second control service comprises first deleting said control specification configuration.

7. The method of claim 6 further comprising providing a unique non-sequential identifier associated with the control specification configuration.

8. The method of claim 7 wherein providing the unique identifier comprises:
    creating a unique identifier;
    maintaining a log of all processed requests; and
    creating an association between the identifier, the access control policy, and the log of requests.

9. The method of claim 8 further comprising restoring a previous control specification configuration associated with a particular identifier.

10. The method of claim 9 further comprising:
    retrieving the association for the particular identifier;
    using the access control policy associated with the particular identifier; and
    feeding the requests and associated decisions associated with the identifier in the process of configuring the second control service, for restoring a previous configuration associated with a particular identifier.

11. The method of claim 4, wherein the second control service is IBM® RACF®.

12. The method of claim 4, wherein the policy is provided in an encoded form comprising an OASIS XACML standard.

13. The method of claim 4, wherein the attribute-based access control policy is a sequestration policy.

14. The method of claim 13, wherein the attribute-based access control policy is encoded using OASIS XACML standard privacy profile.

15. The method of claim 6, further comprising:
    configuring the second control service on a non-production instance of the first control service; and
    installing the configuration when it is complete onto a production instance of the first control service.

16. The method of claim 15 further comprising:
    associating a state of finished with the second control service configuration; and
    blocking all further updates to said configuration, for locking the control service configuration.

17. The method of claim 15, further comprising:
    marking the configuration as not-finished;
    processing additional system requests; and
    marking the configuration as finished when all desired system requests have been processed, for updating said configuration.

18. The method of claim 17 further comprising a first user providing the above method for a second user.

19. The method of claim 4 further comprising modifying the configuration of the second control service such that its decision will agree with that of the first control service.

20. A system configured for processing an access control list configuration request by a first control service using a first control specification language, and a second control service using a second control specification language, the system comprising:
    data storage configured for storing the first and second control specification languages;
    a database configured for creation, deletion, and modification of persistent data;
    memory comprising logic; and
    a processor operatively connected to said memory and configured to:
        receive the access control list configuration request from a configuration request handler;
        provide the request to a first stand-alone control service using high level programming language;

provide the request to a second stand-alone control service using low level programming language;

receive a decision on the request from each of the first and second control services; and compare the decisions to determine if they differ.

21. The system of claim 20 further comprising an input/output subsystem configured for providing a notification to the requester if the two decisions differ.

22. The system of claim 20 wherein the first control specification language is an access control policy.

23. The system of claim 22 further comprising a log of all processed requests.

24. The system of claim 22 further comprising a table of subject-mappings between the access control policy terms and elements of the first control service.

25. The system of claim 24 further comprising additional tables for action-mappings, and resource-mappings.

26. The system of claim 22 wherein the storage is further configured for storing previous access control configurations.

27. The system of claim 22 further comprising a non-production instance of the second control service for testing purposes.

28. A computer program product tangibly embodied on a non-transitory computer readable medium and comprising instructions that, when executed, enables a processor to:

process a request by a first control service using a first control specification language, and a second control service using a second control specification language, the enable element comprising steps of:

receiving the access control list configuration request from a configuration request handler;

providing the request to a first stand-alone control service using a high level programming language;

providing the request to a second stand-alone control service using a low level programming language;

receiving a decision on the request from each of the first and second control services; and comparing the decisions to determine if they differ.

29. The computer program product of claim 28 wherein the first control specification language is an access control policy.

30. The computer program product of claim 29 wherein the processor is further enabled to provide a unique identifier associated with the first control specification configuration.

31. The computer program product of claim 30 wherein the processor is further enabled to:

maintain a log of all processed requests and the decisions made on those requests; and create an association between the unique identifier, the access control policy and the log.

32. The computer program product of claim 31 wherein the processor is further enabled to restore a previous control specification configuration associated with the unique identifier, the restore element comprising steps of:

retrieving the access control policy associated with the unique identifier;

retrieving the log of processed requests and decisions associated with the unique identifier; and providing the processed requests and decisions to the first control service to configure the first control service with the previous control specification configuration.

33. The computer program product of claim 29 wherein the processor is further enabled to: modify the second control specification configuration so that its decisions agree with the decisions of the first control service.

34. The computer program product of claim 29 wherein the processor is further enabled to initialize the control specification configuration by setting the control service to deny all access requests.

35. A system for obtaining services for processing an access control list configuration request by a first control service using a first control specification language, and a second control service using a second control specification language, the system comprising:

receiving the access control list configuration request from a configuration request handler; providing the access request to a first stand-alone control service using a high-level programming language ; providing the access request to a second stand-alone control service using a low-level programming language; receiving a decision on the access request from each of the first control services; comparing the decisions to determine if they differ, wherein differing decisions indicate a need to modify the configuration of said access control list using said first control service; and providing notification of the comparison to the requestor.

* * * * *